(12) United States Patent
Zisimopoulos et al.

(10) Patent No.: US 8,942,707 B2
(45) Date of Patent: Jan. 27, 2015

(54) HANDOVER

(75) Inventors: Haris Zisimopoulos, London (GB); Ricky Kaura, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 13/696,707

(22) PCT Filed: Apr. 28, 2011

(86) PCT No.: PCT/KR2011/003134
§ 371 (c)(1),
(2), (4) Date: Dec. 26, 2012

(87) PCT Pub. No.: WO2011/139045
PCT Pub. Date: Nov. 10, 2011

(65) Prior Publication Data
US 2013/0143565 A1 Jun. 6, 2013

(30) Foreign Application Priority Data

May 7, 2010 (GB) .................................. 1007670.1

(51) Int. Cl.
*H04W 36/00* (2009.01)
*H04W 36/14* (2009.01)
(Continued)

(52) U.S. Cl.
CPC .............. *H04W 36/30* (2013.01); *H04W 36/14* (2013.01); *H04W 76/045* (2013.01)
USPC ............ 455/438; 455/436; 455/439; 370/331

(58) Field of Classification Search
CPC ..... H04W 36/30; H04W 36/12; H04W 36/18; H04W 80/04

USPC ........................... 455/438, 437, 439; 370/331
See application file for complete search history.

(56) References Cited

U.S. PATENT DOCUMENTS 6,990,088 B2 * 1/2006 Madour ...................... 370/331
8,195,167 B1 * 6/2012 Vargantwar ................ 455/442
(Continued)

FOREIGN PATENT DOCUMENTS

KR 10-2004-0049124 A 6/2004
KR 10-2005-0063601 A 6/2005
(Continued)

OTHER PUBLICATIONS

Samsung, "SRVCC during alerting phase fixes", 3GPP TSG SA WG2 Meeting #77, S2-100314, p. 1-4, Jan. 18-22, 2010.
(Continued)

*Primary Examiner* — Danh Le
(74) *Attorney, Agent, or Firm* — Jefferson IP Law, LLP (57) ABSTRACT

A method of handover of a User Equipment (UE) from first to second Radio Access Network (RANs), the second RAN coupled to a Mobility Controller (MC) and having an association with the first RAN, the UE capable of communication with a Session Transfer Controller (STC) via the first and second RANs, includes receiving a first message at the MC from the first RAN requesting handover of the UE to the second RAN, sending a second message from the MC to the STC subscribing the MC to status updates from the STC, said status updates relating to status of a call, receiving one of said status updates at the MC originated by the STC, dependent on a communication via the first RAN from the UE to the STC of a change in the status, and in response to receipt of said status update, updating a call status indicator of the MC.

16 Claims, 9 Drawing Sheets

(51) Int. Cl.
*H04W 36/30* (2009.01)
*H04W 76/04* (2009.01)

(56) References Cited

U.S. PATENT DOCUMENTS

| | | | |
|---|---|---|---|
| 8,224,327 B2* | 7/2012 | Suh et al. | 455/436 |
| 8,543,131 B2* | 9/2013 | Premec | 455/456.1 |
| 2009/0005050 A1* | 1/2009 | Lee et al. | 455/442 |
| 2009/0323634 A1* | 12/2009 | Kim et al. | 370/331 |
| 2010/0041405 A1* | 2/2010 | Gallagher et al. | 455/436 |
| 2010/0054209 A1 | 3/2010 | Mahdi | |
| 2011/0032824 A1* | 2/2011 | Eyuboglu et al. | 370/237 |
| 2011/0075632 A1* | 3/2011 | Lim et al. | 370/331 |

FOREIGN PATENT DOCUMENTS

| | | |
|---|---|---|
| WO | 2007-026267 A2 | 3/2007 |
| WO | 2010-022652 A1 | 3/2010 |

OTHER PUBLICATIONS

Samsung, "Fixing issues in the SRVCC for alerting case" 3GPP-SA2 Meeting #77, S2-100315, Jan. 18-22, 2010.

* cited by examiner

HANDOVER

TECHNICAL FIELD

The present invention relates generally to wireless networks, and more specifically to a method and apparatus for improving handover of a user equipment between a first radio access network and a second radio access network.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks), "UTRA" is used to refer to the radio access technology associated with UTRAN (UTRA networks), and similarly the term "E-UTRA" or "LTE" is used to refer to the radio access technology associated with EUTRAN (E-UTRA networks).

LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology. A user equipment may be typically capable of communication using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

In service areas where a radio access network, such as an LTE/E-UTRA network, does not support voice communication, user equipment may follow a defined procedure to fall back to using another radio access network, such as UTRAN or GERAN, for voice communications, typically falling back to circuit switched voice communications.

There are a variety of handover procedures that have been developed to allow handover of a user equipment between a E-UTRA network and a UTRA/GERA network. In particular, handover procedures have been developed to allow handover when a voice call is in progress, that is to say so-called Voice Call Continuity (VCC) handover procedures. Typically a VCC procedure will be implemented under the control of a session transfer controller, which will typically comprise a Service Centralisation and Continuity Application Server (SCC AS) and a Serving Call Session Control Function and/or Interrogating Call Session Control function (I/S-CSCF). The session transfer controller is typically implemented in the Internet Protocol Multimedia Subsystem (IMS).

The IMS is typically used to control packet switched services offered over the E-UTRA network; control of circuit switched services in a UTRA/GERA network typically involves a mobility controller, such as a Mobility Switching Centre (MSC). The session transfer controller typically communicates with the mobility controller during handover according to a VCC procedure.

A user equipment may be equipped with a single radio transceiver, for reasons of economy or for minimising power consumption, so that simultaneous communication with two radio access networks is not possible. In this case the handover protocol typically uses a break-before-make radio connection during handover. Handover procedures known as Single Radio Voice Call Continuity (SR VCC) procedures have been developed for such situations.

DISCLOSURE OF INVENTION

Technical Problem

Conventionally, handover procedures between radio access networks involving voice call continuity are applicable to situations in which the status of a call in unchanged during a handover procedure, for example a voice call may be required to be an ongoing call for handover to be carried out.

However, handover schemes may encounter problems if the status of a call changes before or during the handover procedure, for example if a call in an alerting state is answered.

Solution to Problem

In accordance with a first aspect of the present invention, there is provided a method of assisting handover of a user equipment from a first radio access network to a second radio access network, the second radio access network being coupled to a mobility controller and having an association with the first radio access network, and the user equipment being capable of communication with a session transfer controller by use of the first and second radio access networks, the method comprising:

receiving a first message at the mobility controller from the first radio access network requesting handover of the user equipment to the second radio access network;

sending a second message from the mobility controller to the session transfer controller subscribing the mobility controller to status updates originated by the session transfer controller, said status updates relating to a status of a call to or from the user equipment;

receiving one of said status updates at the mobility controller originated by the session transfer controller, dependent on a communication via the first radio access network from the user equipment to the session transfer controller of a change in the status of said call; and in response to receipt of said status update, updating a call status indicator of the mobility controller.

An advantage of subscribing the mobility controller to the status updates originated by the session transfer controller, is that, if the status were to change after the receipt of the first message at the mobility controller and before handover of the user equipment to the second radio access network, the call status indicator of the mobility controller will be updated to be consistent with the state of a call status indicator of the user equipment, so that call continuity may be maintained on handover of the user equipment to the second radio access network.

For example, when the first message is sent the call may be in alerting state, that is to say the status of the call is that the call is in alerting state, so that the session transfer controller will be informed that the call is in alerting state, and this information will be relayed to the mobility controller. If the call is answered before handover, the call status indicator at the user equipment will move to active state and a message indicating the change of status will be sent from the first user equipment to the session transfer controller using the first radio access network. Since the mobility controller is subscribed to the status updates originated by the session transfer controller, the mobility controller will be informed of the change of status.

However, if the mobility controller were not subscribed to the status updates, the change in call status would typically not be relayed to the mobility controller. Furthermore, the mobility controller would not receive any indication from the user equipment regarding the call status change, because the user equipment is typically arranged to send only one message when the call status changes. If the user equipment is subsequently handed over from the first radio access network to the second radio access network, a second message will not typically be sent. So, if the mobility controller were not subscribed to the status updates the call status indicator at the user equipment and the call status indicator at the mobility controller may be in different states, that is to say that the state machine in the user equipment may not be synchronised with the state machine in the mobility controller. This may interrupt the call continuity during handover.

In an embodiment of the invention, said association of the second radio access network with the first radio access network is via a core network associated with the first radio access network, the method comprising receiving the first message from said core network.

In an embodiment of the invention, the first radio access network is capable of supporting packet switched voice communication and the second radio access network is capable of supporting circuit switched voice communication; the method of assisting handover according to the first aspect of the invention is particularly suited for use in assisting handover between such networks, as a mobility controller is typically associated with a network capable of supporting circuit switched voice communication.

In an embodiment of the invention, the user equipment has a single radio interface for communicating with the first wireless network and the second wireless network, such that a radio connection with the first wireless network must be broken before a radio connection with the second wireless network is made when participating in said handover.

Preferably, the user equipment has a single radio interface for communicating with the first wireless network and the second wireless network, such that only one radio connection with a wireless network can exist at any given point in time. It is advantageous to equip a user equipment with a single radio transceiver in terms of cost reduction and/or minimisation of power consumption. However, with a single radio interface a mechanism is required for communicating information received from a user equipment connected in one radio access network to another radio access network, particularly during handover, since the user equipment cannot be connected to both networks at the same time. The method of claim 1 is particularly applicable for use with a user equipment having a single radio interface.

Preferably, the mobility controller is subscribed to the updates for a predetermined period, with the advantage that the signalling overhead that would be associated with continuous subscription is avoided.

Preferably, the predetermined period approximately equals a time period required to complete the handover from the first radio access network to the second radio access network.

In an embodiment of the invention, the second message is sent dependent upon receipt of the first message at the mobility controller; this has an advantage that the subscribing of the mobility controller to status updates originated by the session transfer controller may be limited to situations in which handover has been requested.

In an embodiment of the invention, the second message is sent in response to receipt of an indication from the session transfer controller that the call is in alerting status; this has an advantage that the subscribing of the mobility controller to status updates originated by the session transfer controller may be limited to situations in which the call is in alerting status.

In an embodiment of the invention, one of said status updates to the mobility controller is originated at the session transfer controller dependent on the receipt of the second message and a communication at the session transfer controller from the user equipment indicating a change of status of the call. This has an advantage that the call status indicator at the mobility controller may be updated to be in accordance with a call status indicator at the user equipment.

Preferably, the one of said status updates indicates that the user has answered the call.

In an embodiment of the invention, the mobility controller is a Mobile Switching Centre Server (MSC-S).

In an embodiment of the invention, the session transfer controller comprises a Service Centralisation and Continuity Application Server (SCC AS).

In an embodiment of the invention, the handover comprises Single Radio Voice Call Continuity (SRVCC) procedures.

In accordance with a second aspect of the present invention, there is provided a mobility controller capable of assisting handover of a user equipment from a first radio access network to a second radio access network, the second radio access network being coupled to the mobility controller and having an association with the first radio access network, and the first and second radio access networks being capable of communication with a session transfer controller, the mobility controller being arranged to:

receive a first message from the first radio access network requesting handover of the user equipment to the second radio access network;

send a second message to the session transfer controller subscribing the mobility controller to status updates originated by the session transfer controller, said status updates relating to a status of a call to or from the user equipment;

receive one of said status updates at the mobility controller originated by the session transfer controller, dependent on a communication via the first radio access network from the user equipment to the session transfer controller of a change in the status of said call; and in response to receipt of said status update, update a call status indicator of the mobility controller to synchronise the call status in the mobility controller with that of the user equipment in support of continuity of the call on handover of the user equipment to the second radio access network.

In accordance with a third aspect of the present invention, there is provided a session transfer controller capable of assisting handover of a user equipment from a first radio access network to a second radio access network, the second radio access network being coupled to a mobility controller and having an association with the first radio access network, and the first and second radio access networks being capable of communication with the session transfer controller, the session transfer controller being arranged to:

receive a second message originated by the mobility controller subscribing the mobility controller to status updates originated by the session transfer controller, said status updates relating to a status of a call to or from the user equipment;

receiving a communication from the user equipment indicating a change of status of said call; and dependent on the receipt of the second message and said communication, originate one of said status updates to the mobility controller.

In accordance with a fourth aspect of the present invention, there is provided a method of assisting call handling for use in a telecommunications network comprising a first radio access network and a second radio access network, the second radio access network being coupled to a mobility controller and having an association with the first radio access network, and the first and second radio access networks being capable of communication with a session transfer controller, the method comprising:

receiving a message at the session transfer controller indicating that handover of the user equipment to the second radio access network has been requested;

receiving a communication at the session transfer controller, via the first radio access network, the communication having been originated by the user equipment and the communication indicating a change in the status of a call to or from the user equipment; and in response to receipt of said message and said communication, sending a message to the mobility controller indicating that the call may be dropped. This has an advantage that, by dropping the call, a situation may be avoided in which a call status indicator at the user equipment and a call status indicator at the mobility controller are in different states, that is to say that a state machine in the user equipment is not synchronised with a state machine in the mobility controller. Such an unsynchronised state may disrupt the proper operation of the control of the call, and it may be preferable to drop the call so that the user re-dials once handover is completed.

In accordance with a fifth aspect of the present invention, there is provided a session transfer controller capable of assisting call handling for use in a telecommunications network comprising a first radio access network and a second radio access network, the second radio access network being coupled to a mobility controller and having an association with the first radio access network, and the first and second radio access networks being capable of communication with the session transfer controller, the session transfer controller being arranged to:

receive a message indicating that handover of the user equipment to the second radio access network has been requested;

receive a communication, via the first radio access network, the communication having been originated by the user equipment and the communication indicating a change in the status of a call to or from the user equipment; and in response to receipt of said message and said communication, send a message to the mobility controller indicating that the call may be dropped.

In accordance with a sixth aspect of the present invention, there is provided method of assisting handover of a user equipment from a first radio access network to a second radio access network, the method comprising:

delaying sending information from the user equipment indicating a change in the status of a call to or from the user equipment by a delay period; and sending said information via the second radio access network if handover of the user equipment to the second radio access network has been completed after the delay period has expired, and if otherwise, sending said information via the first radio access network.

Preferably, the method comprises determining a likelihood of a handover of the user equipment from the first radio access network to the second radio access network, and delaying sending information from the user equipment indicating a change in the status of a call to or from the user equipment by a delay period, the delaying being dependent on the determined likelihood of a handover. An advantage of delaying sending information from the user equipment indicating a change in the status of a call dependent on a likelihood of a handover of the user equipment is that, if a handover is likely, the sending of information indicating a change of status may be delayed for long enough for a handover to be requested and completed before the information is sent, so that the information is sent via the second radio access network if a handover has been requested. This avoids the situation in which the information is sent via the first radio access network, after handover has been requested but before handover has been completed, which may result in a lack of synchronisation between finite state machines in the user equipment and in a mobility controller of the second radio access network.

In accordance with a seventh aspect of the present invention, there is provided user equipment capable of assisting handover from a first radio access network to a second radio access network, the user equipment being arranged to:

delay sending information indicating a change in the status of a call, the call being to or from the user equipment, by a delay period; and send said information via the second radio access network if handover of the user equipment to the second radio access network has been completed after the delay period has expired, and if otherwise, sending said information via the first radio access network.

Preferably, the user equipment is arranged to determine a likelihood of a handover of the user equipment from the first radio access network to the second radio access network; and delay said sending dependent on the determined likelihood of a handover. Further features and advantages of the invention will be apparent form the following description of preferred embodiments of the invention, which are given by way of example only.

Advantageous Effects of Invention

An advantage of subscribing the mobility controller to the status updates originated by the session transfer controller, is that, if the status were to change after the receipt of the first message at the mobility controller and before handover of the user equipment to the second radio access network, the call status indicator of the mobility controller will be updated to be consistent with the state of a call status indicator of the user equipment, so that call continuity may be maintained on handover of the user equipment to the second radio access network.

MODE FOR THE INVENTION

By way of example an embodiment of the invention will now be described in the context of a telecommunication network including a radio access network supporting communication using E-UTRA/LTE radio access technology, as associated with EUTRAN networks in LTE systems, supporting packet switched voice communication, and another radio access network supporting communication using GERA/UTRA radio access technology, as associated with GERAN/UTRAN networks in GSM/UMTS systems, supporting circuit switched voice communication. However, it will be understood that this is by way of example only and that other embodiments may involve wireless networks using other radio access technologies, such as IEEE802.16 WiMax systems; embodiments are not limited to the use of a particular radio access technology.

Initial deployments of E-UTRAN networks are typically within areas of coverage of existing wireless networks, such as legacy GERAN/UTRAN networks. On initial deployment, a E-UTRAN network provides service to a smaller geographical area than that covered by existing legacy networks, covering for example city centres, and the areas covered may not be contiguous. Furthermore, only a subset of the available network features may be enabled, and the enablement of features may not be uniform across the network. In particular, due to its potentially enhanced data capacity in comparison with legacy systems, initial deployments of E-UTRAN may concentrate on providing high bandwidth data services, for example to LTE enabled equipment such as personal digital assistants (PDAs) or to user equipment in the form of plug in communication modules for laptop computers. For this reason, the primary LTE voice service, a packet switched service known a Voice over IMS (VoIMS), may not be available in certain areas.

If a user equipment moves out of an area of coverage of an E-UTRAN network, then a handover to a GERAN/UTRAN network may be required, and the handover may be a Single Radio Voice Call Continuity (SRVCC) handover.

Figure 1:
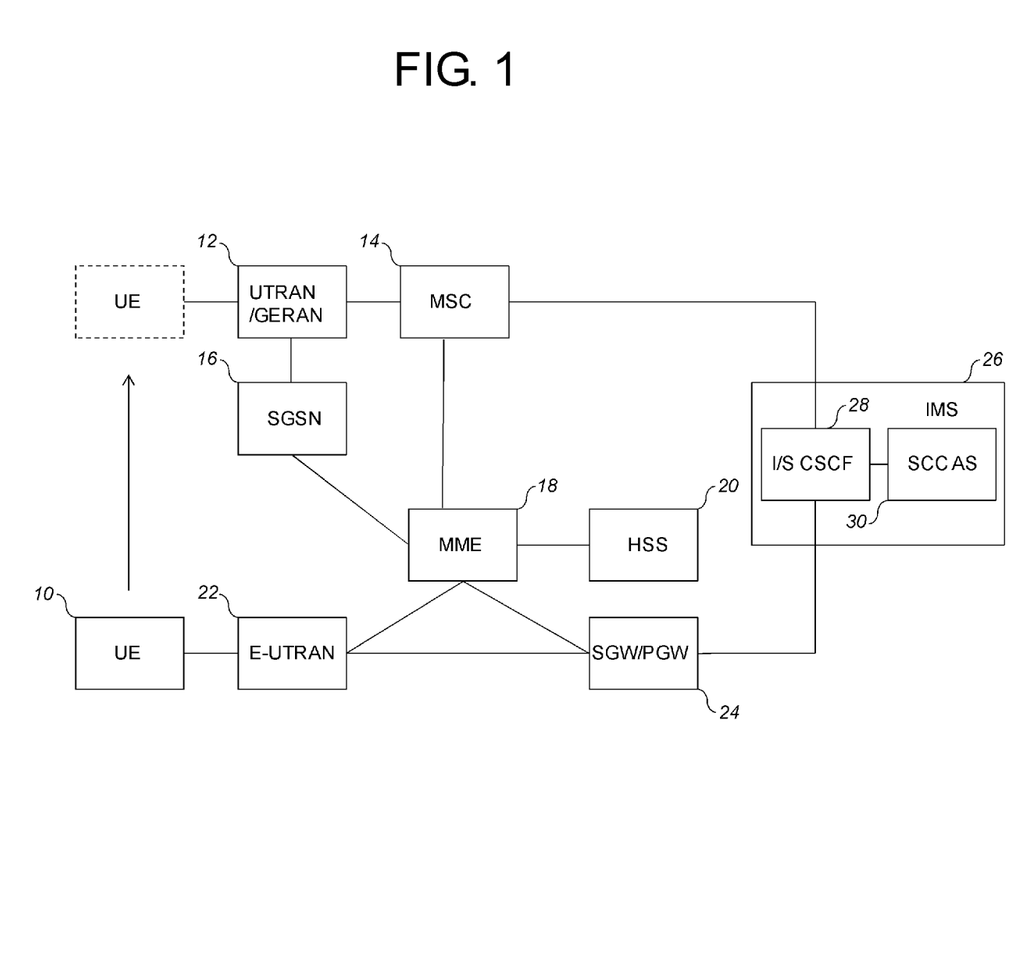
FIG. 1 is a schematic diagram showing signalling paths in telecommunications network in support of SRVCC handover.

FIG. 1 shows signalling paths in a telecommunications network in support of SRVCC handover. A user equipment 10 is connected to a first radio access network, being in this example a E-UTRAN radio access network 22, and handover is required to a second radio access network, in this example a UTRAN/GERAN radio access network 12, so that the user equipment, on handover to the second radio access network, is connected to the UTRAN/GERAN radio access network 12.

The first radio access network has a core network including a Mobile Management Entity (MME) 18, which is connected to a Home Subscriber Server (HSS) 20 and a Serving Gate-Way/Packet GateWay (SGW/PGW) 24, which acts in support of handover within E-UTRAN. An Internet Protocol Multimedia subsystem (IMS) 26 is capable of communication with the first radio access network via the SGW/PGW 24 and with the second radio access network via the MSC 14.

The second radio access network has a mobility controller, in this example the Mobile Switching Centre (MSC) or Mobile Switching Centre Server (MSC-S) 14. The second radio access network also has a Serving General Packet Radio Service Support Node (SGSN) 16, which has a connection to the MME 18.

The IMS 26 comprises a session transfer controller, which in this example comprises a Service Centralisation and Continuity Application Server (SCC AS) 30 and a Serving Call Session Control Function and/or Interrogating Call Session Control function (I/S-CSCF) 28.

Figure 2:
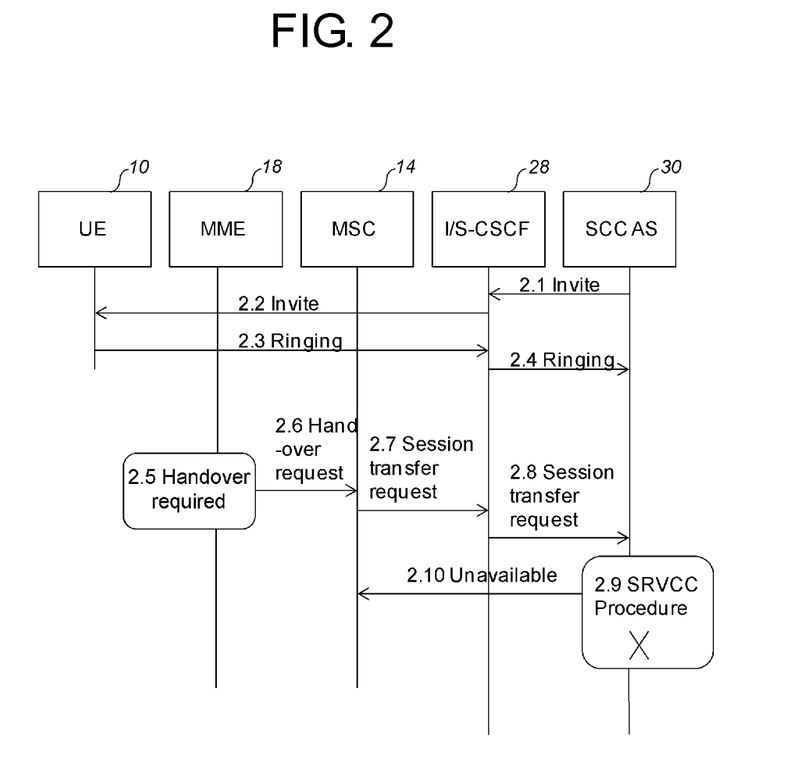
FIG. 2 is a schematic diagram showing a conventional response to a handover request during alerting phase of a call.

FIG. 2 shows a conventional response to a handover request during an alerting phase of a call, when the user equipment 10 is camped in the E-UTRAN radio access network. An alerting phase relates to a call from initiation of the call to answering of the call, that is to say including the phase when a terminal is ringing, and may include what may also be referred to as pre-alerting phase, that is to say after initiation but before ringing. The status of the call may be referred to as alerting or in alerting state, when the call is in an alerting phase. In this and the following examples, messages are shown relating to a call to the user equipment 10, but it will be understood that the invention also relates to calls made by the user equipment, that is to say the invention applies to both terminations and originations.

At step 2.1, an Invite, i.e. a call initiation is sent from the SCC AS 30 via the I/S-CSCF 28 at step 2.2 to the user equipment 10. The user equipment 10 responds at step 2.3 to send a message indicating that it is ringing, the message being sent via the I/S CSCF 28 at step 2.4 to the SCC AS 30. A call status indicator of the user equipment, is accordingly in alerting state. A call status indicator in the SCC AS relating to the call may also be set to alerting state, that is to say a finite state machine indicating call status at the user equipment is brought into synchronisation with a finite state machine at the SCC AS indicating call status.

At step 2.5, the MME 18 receives a message from the serving E-UTRAN, that is to say the first radio access network, indicating that handover is required to the second radio access network, in this case the GERAN/UTRAN. A handover message is accordingly send to the MSC or MSC-S 14 at step 2.6, and the MSC or MSC-S 14 then sends a session transfer request to the US-CSCF at step 2.7, which is then relayed to the SCC AS 30. However, in this case, at step 2.9, the SCC AS does not implement the SRVCC procedure. Instead, at step 2.10, an "unavailable" message is sent to the MSC or MSC-S 14 declining handover, and the call may be dropped. Specifically, the message at step 2.10 may be a SIP 480 temporarily unavailable message, rejecting the transfer request. If the MSC or MSC-S 14 receives the SIP 480 temporarily unavailable message before handover, the session transfer will be rejected and the user equipment will not be handed over and may remain connected to the first radio access network, or the call will be dropped if the signal reception in the first radio access network is unsatisfactory. If the MSC or MSC-S 14 receives the SIP 480 temporarily unavailable message after the user equipment has been handed over to the second radio access network, this is an indication that the session will not be fully established, i.e. the call may be dropped. In either case, the SRVCC procedure will not be implemented if the call is in an alerting phase, and the call may be dropped.

This procedure avoids a potential problem if the call were to be answered before handover to the second radio access network, due to the call status indicator in the user equipment being in a different state to that in the MSC or MSC-S. However, the procedure has the consequence that any attempt to perform SRVCC in the pre-alerting or alerting phases will fail. The unavailability of SRVCC in the pre-alerting or alerting phases may result in an unsatisfactory user experience.

Figure 3:
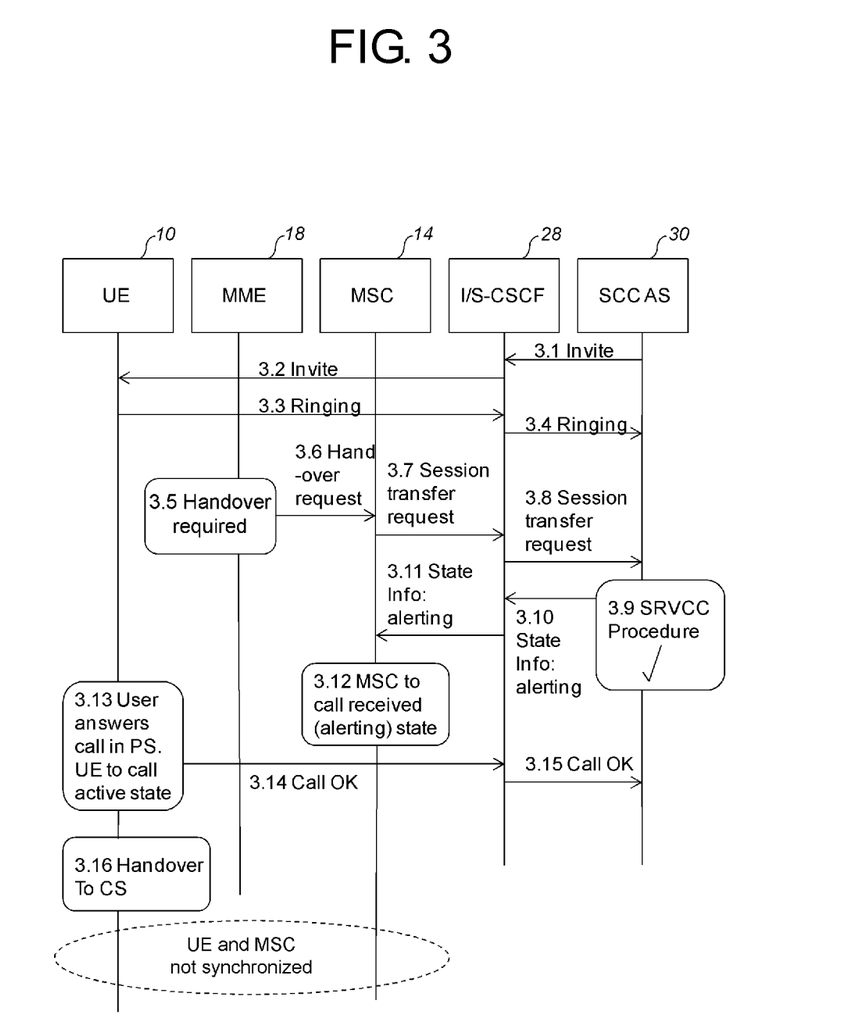
FIG. 3 is a schematic diagram illustrating a problem with enabling SRVCC, when handover is initiated during alerting phase of a call.

FIG. 3 illustrates a potential problem with enabling SRVCC when handover is initiated during an alerting phase of a call. Steps 3.1 to 3.8 proceed similarly to steps 2.1 to 2.8 respectively with reference to FIG. 2. In this example, the SRVCC procedure is implemented at step 3.9, so that handover of the user equipment 10 to the second radio access network is carried out. At step 10, a state information message may be sent to the I/S-CSCF 28 and passed on at step 3.11 to the MSC or MSC-S 14. The MSC may then move to call received (alerting) state in relation to the call at step 3.12, that is to say a call status indicator is set to alerting state.

However, in this illustrative example, the call is answered at step 3.13 before the handover of the user equipment to the second radio access network. The user equipment sends a message indicating that the call has been answered, an OK or call OK message, which is sent at step 3.14 to the US-CSCF 28 and relayed at step 3.15 to the SCC AS 30. That is to say, the call has been answered when the user equipment 10 is connected to the first radio access network in packet switched (PS) mode, so that signalling appropriate to packet switched is sent, such as a Session Initiation Protocol (SIP) 200-OK message. After sending the call OK message, the user equipment is handed over at step 3.16 to the second radio access network that supports circuit switched communication. A call status indicator at the user equipment 10 may then be set to show that the call is active, i.e. the status is call active state. However, the user equipment conventionally only sends a message indicating a change of status once, in this case the message indicating the call had been answered and the call had moved to active state. Therefore, it does not send a message via the second radio access network to the MSC or MSC-S 14 indicating that the call has been answered, since it has already sent the call OK message via the first radio access network to the SCC AS. As a consequence, the MSC or MSC-S is not informed of the change of status of the call, so that a status indicator relating to the call at the MSC or MSC-S 14 indicates that the call is in alerting state, whereas a status indicator at the user equipment 10 has moved to indicating that the call is in active state. That is to say, the call status indicators in the user equipment 10 and the MSC or MSC-S 14 are in different states, which is to say that the finite state machines at the user equipment 10 and the MSC 14 are not synchronised. This may cause problems for the continuity of the call. It is also the case in this example that finite state machines in the UE 10, the MSC or MSC-S 14 and the SCC AS 30 are not synchronised. It is desirable that at least the finite state machines indicating call status in the UE 10 and the MSC 14 are synchronised together, and preferably the finite state machines in the UE 10, the MSC or MSC-S 14 and the SCC AS 30 are synchronised together for proper operation resulting in call continuity. Conventionally, the call is dropped according to the procedure illustrated by FIG. 2 in preference to encountering a situation in which the finite state machines at the UE 10 and the MSC or MSC-S 14 are not synchronised, as this may result in a race condition, in which operation of the network is not well controlled, which may result in a potentially unsatisfactory user experience. In particular, the MSC 14, or more specifically the MSC server, may not be able to serve the user plane of the user equipment.

Figure 4:
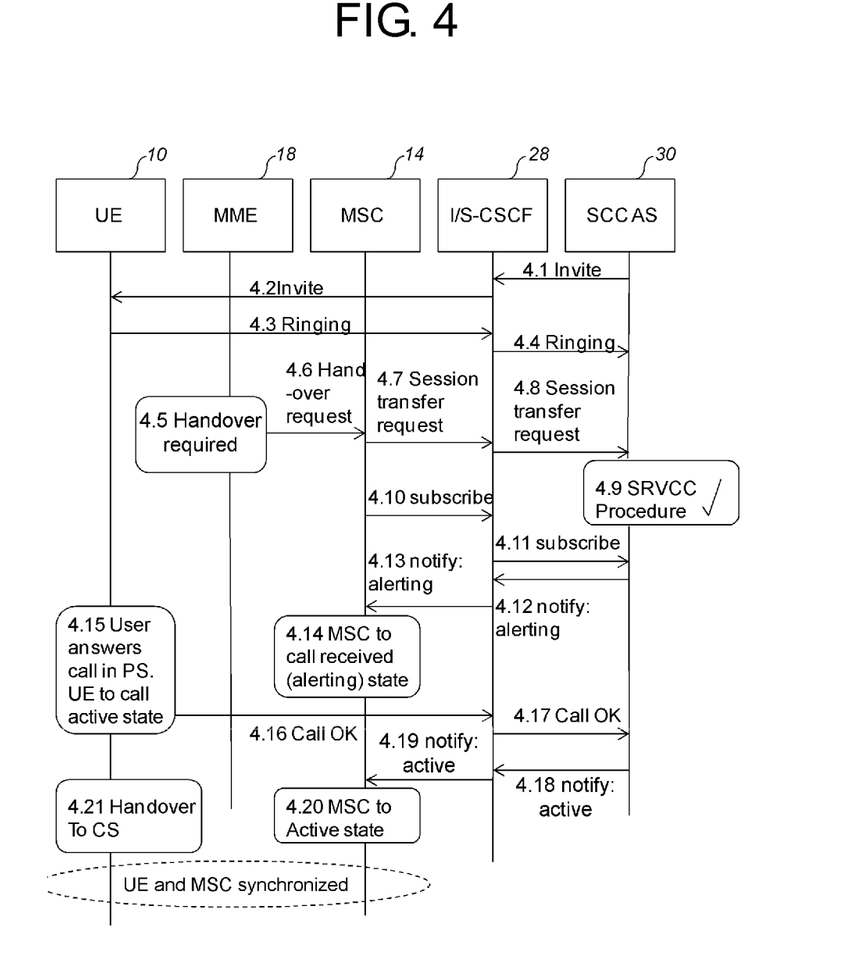
FIG. 4 is a schematic diagram illustrating a first embodiment of the invention.

FIG. 4 illustrates a solution to the problem illustrated by FIG. 3 in a first embodiment of the invention. Steps 4.1 to 4.8 proceed as has already been described with reference to steps 2.1 to 2.8 respectively. That is to say, the SCC AS 30 receives a message indicating that a call is in alerting phase, and also receives a session transfer request (i.e. a request for handover to the second radio access network), and the MSC or MSC-S 14 receives a handover request at step 4.6. At step 4.9, the single radio voice call continuity process is implemented. In response to the receipt of the handover request at step 4.6, the mobility controller sends a message to the session transfer controller, subscribing the mobility controller to status updates originated by the session transfer controller, the status updates relating to a status of a call to or from the user equipment. Specifically, in the first embodiment, at step 4.10 the MSC or MSC-S 14 sends a subscribe message to the US-CSCF 28, which is then sent from the I/S-CSCF 28 to the SCC AS 30 at step 4.11. The subscribe message may subscribe the mobility controller to a defined SIP dialog-event package such as RFC4235. The subscription may be for a limited period, that may be a predefined period, to reduce the amount of signalling traffic generated. The subscription period may be up to 360 seconds, as the alerting phase may in practice last up to 360 seconds, but in practice it may be advantageous to set the subscription period to as shorter time, typically approximately 15 seconds. The limited duration of the subscription may be implemented by use of alerting timers at the MSC or MSC-S 14.

As a result of the subscription, status updates are initiated by the session transfer controller. So, specifically in the first embodiment at step 4.11, a notify message, that is to say a status update, is sent from the SCC AS 30 via the US-CSCF 28, which relays the status update at step 4.13 to the MSC or MSC-S 14, indicating that the call status is in alerting state. In the terminology of the dialog-event package, alerting state may be indicated by state information "early". As a result of receiving the status update, the MSC or MSC-S 14 moves to call received (alerting) state at step 4.14, that is to say that a call status indicator at the MSC or MSC-S 14 is set to alerting state.

At step 4.15 the call is answered at the user equipment 10, while the user equipment is camped in the first radio access network, i.e. before handover, so that the communication with the user equipment is by a packet switched connection. The user equipment 10 moves to call active state, that is to say that a call status indicator at the user equipment moves to active state, and the user equipment 10 sends a communication of a change of status of the call via the first radio access network to the session controller, in this embodiment the communication being the sending of a Call OK message at step 4.16 to the US-CSCF 28, which is sent at step 4.17 to the SCC AS 30. In response to receipt of this message the call status indicator at the SCC AS 30 relating to the call is set to active state, and a status update is sent to the mobility controller indicating that the call status has changed to active state. In this embodiment, the status update involves sending a notify message at step 4.18 from the SCC AS 30 via the I/S-CSCF 28, and then sending the notify update message from the I/S-CSCF 28 to the MSC or MSC-S 14 at step 4.19. In the terminology of the dialog-event package, active state may be indicated by state information "confirmed". The alerting state of the MSC or MSC-S may be the state known as N7, "call received state".

In response to receipt of the status update, the call status indicator of the mobility controller is updated, so that in this example the MSC or MSC-S 14 moves to active state at step 4.20. The active state may be the state known as N10.

Hence, the call status indicators in the user equipment 10 and the MSC or MSC-S 14 are in equivalent states, which is to say that the finite state machines at the user equipment 10 and the MSC or MSC-S 14 are synchronised.

At step 4.21, the user equipment is handed over to the second radio access network. It is beneficial in supporting continuity of the call on handover that the call status indicators in the user equipment 10 and the MSC or MSC-S 14 are in equivalent states.

Figure 5:
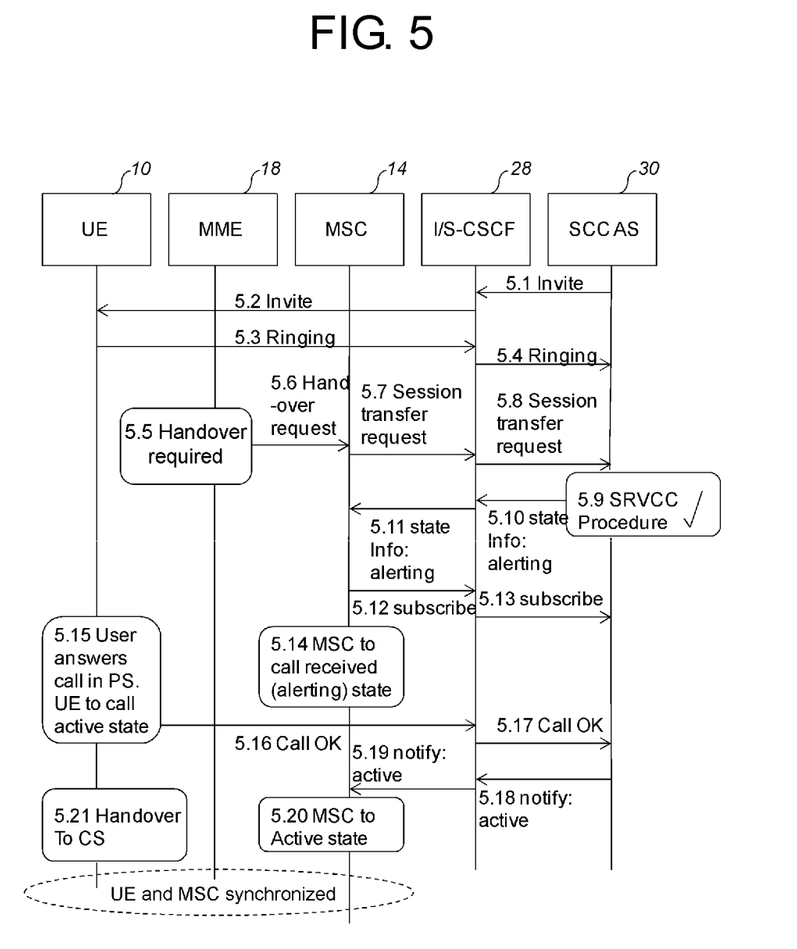
FIG. 5 is a schematic diagram illustrating a second embodiment of the invention.

FIG. 5 illustrates a second embodiment of the invention. Steps 5.1 to 5.8 and 5.14 to 5.21 proceed in a similar manner to steps 4.1 to 4.8 and steps 4.14 to 4.21 respectively as already described. The second embodiment differs from the first embodiment in that the sending of the message from the mobility controller to the session transfer controller, subscribing the mobility controller to status updates originated by the session transfer controller, is in response to receipt at the mobility controller of an indication, typically from the session transfer controller, that the call is in alerting status. This is in contrast to the first embodiment, in which the message is sent in response to receipt of a handover request at the MSC or MSC-S 14. As a variant of the second embodiment, the sending of the message may be dependent on receipt of both the indication that the call is in alerting state and a handover request as described with reference to the first embodiment.

At step 5.9, a SRVCC procedure is implemented, and then at step 5.10 a message is sent to the I/S-CSCF, to be relayed at step 5.11 to the MSC or MSC-S 14, conveying an indication that the call is in alerting status. The message may be a state information message, in the form of a provisional response. In response to receipt of the message conveying the indication that the call is in alerting status, at step 5.12 the MSC or MSC-S 14 sends a subscribe message to the US-CSCF 28, which is then sent from the I/S-CSCF 28 to the SCC AS 30 at step 5.13. The subscribe message may subscribe the mobility controller to a defined SIP dialog-event package such as RFC4235. Also in response to receipt of the message conveying the indication that the call is in alerting status, the call status indicator of the mobility controller may be updated, so that in this example the MSC or MSC-S 14 is set to alerting state at step 5.14. As a result of the subscription, the MSC 14 may receive a status update originated at the SCC AS 30, and this may also convey the indication that the call is in alerting status. The call status indicator of the mobility controller may be confirmed or updated on the basis of this status update, however, in the case illustrated in FIG. 5, this status update would simply confirm the indication conveyed by the state information message at step 5.12 and so this status update message is not shown.

At step 5.15 the call is answered at the user equipment 10, similarly to step 4.15 in the system of FIG. 4, and steps 5.16 to 5.21 proceed similarly to steps 4.16 to 4.21 previously described, so that the call status indicator of the mobility controller is updated, so that the MSC or MSC-S 14 moves to active state at step 5.20, and the call status indicators in the user equipment 10 and the MSC or MSC-S 14 are in equivalent states, which is to say that the finite state machines at the user equipment 10 and the MSC or MSC-S 14 are synchronised.

Figure 6:
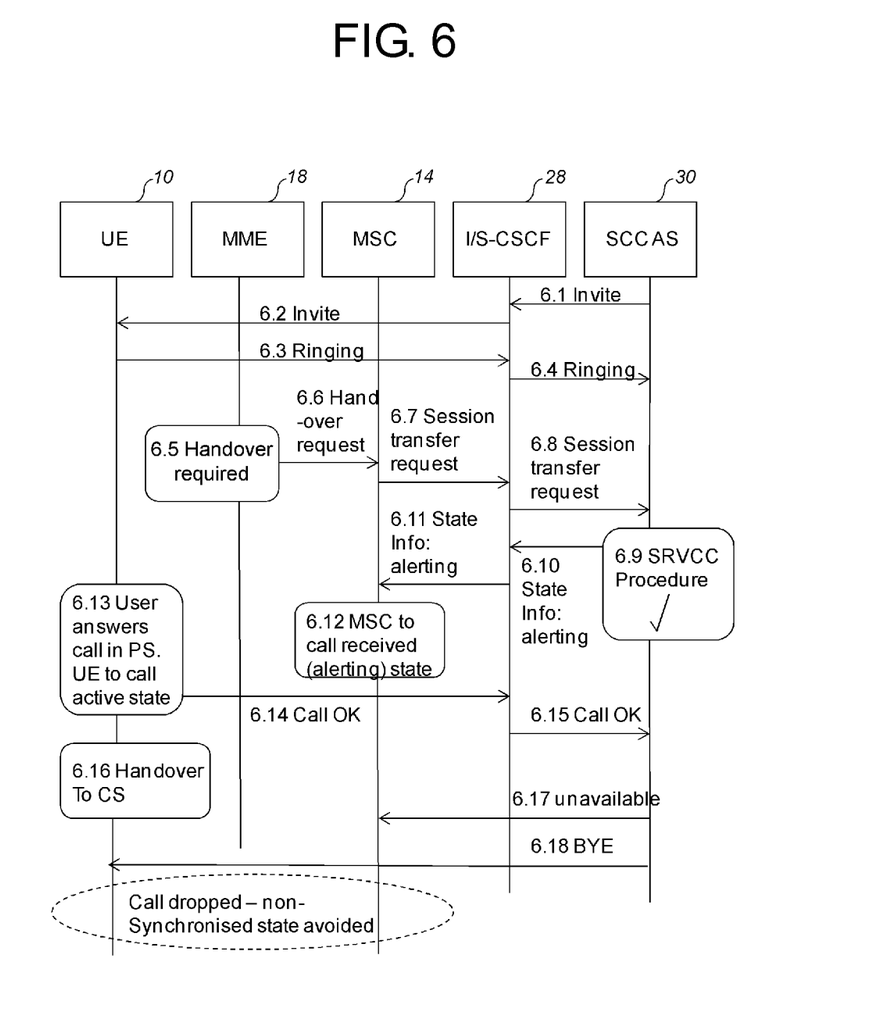
FIG. 6 is a schematic diagram illustrating a third embodiment of the invention.

FIG. 6 illustrates a third embodiment of the invention, in which the mobility controller is not subscribed to status updates from the session transfer controller, but instead the call is deliberately dropped if the call is answered after a session transfer request has been received by the session transfer controller but before the user equipment has been handed over. This avoids a situation in which the finite state machines at the UE 10 and the MSC or MSC-S 14 are not synchronised, as this may result in a race condition, in which operation of the network is not well controlled, as was described in connection with FIG. 3. The caller can re-dial in the event that this situation is encountered.

The third embodiment differs from the conventional solution as illustrated by FIG. 2, at least in that the SRVCC procedure is implemented, at step 6.9, despite the call being in an alerting phase, so that the call may be handed over if it remains in alerting phase. The call status indicators at the user equipment 10 and the MSC or MSC-S 14 would both be in alerting status if the call remains in alerting phase and so the finite state machines at the user equipment 10 and the MSC or MSC-S 14 would be synchronised, so that the call may continue in alerting phase on handover without problems.

Steps 6.1 to 6.11 proceed in a similar manner to steps 5.1 to 5.11 respectively as already described with reference to FIG. 6, so that a session transfer request is received at the SCC AS 30, the SRVCC procedure is implemented, and state information is sent to the MSC or MSC-S 14 indicating that the call is in alerting phase. On receipt of the state information, the MSC or MSC-S is set to alerting phase at step 6.12.

At step 6.13, the call is answered at the user equipment 10 while the user equipment is still connected to the first radio access network, so in this example communication is still in packet switched mode. The call status indicator at the user equipment moves to active state, and at step 6.14 a communication originated by the user equipment 10 is sent to the I/S-CSCF 28, via the first radio access network, indicating that the call is answered. The communication may be a SIP 200-OK message, and at step 6.15 the message is passed to the SCC AS 30. At step 6.16, the user equipment is handed over to the second radio access network, which in this example uses circuit switched communication.

On receipt of the communication indicating that the call is answered, the SCC AS 30 sends a message to the MSC or MSC-S 14 at step 6.17 indicating that the call may be dropped. The message indicating that the call may be dropped may be an "unavailable" message, sent to the MSC or MSC-S 14 at step 6.17. Specifically, the message at step 6.17 may be a SIP 480 temporarily unavailable message. The effect of receiving this message at the MSC or MSC-S 14 after the user equipment has been handed over to the second radio access network is that the session transfer is not carried out and so the call may be dropped.

The SCC AS 30 may also send a message to the UE ending the call, such as a "BYE" message. The "BYE" message may also be sent to the remote party, in this example the caller, thus clearing up the SIP dialog. Either the caller or the called party may then re-establish the call.

Figure 7A:
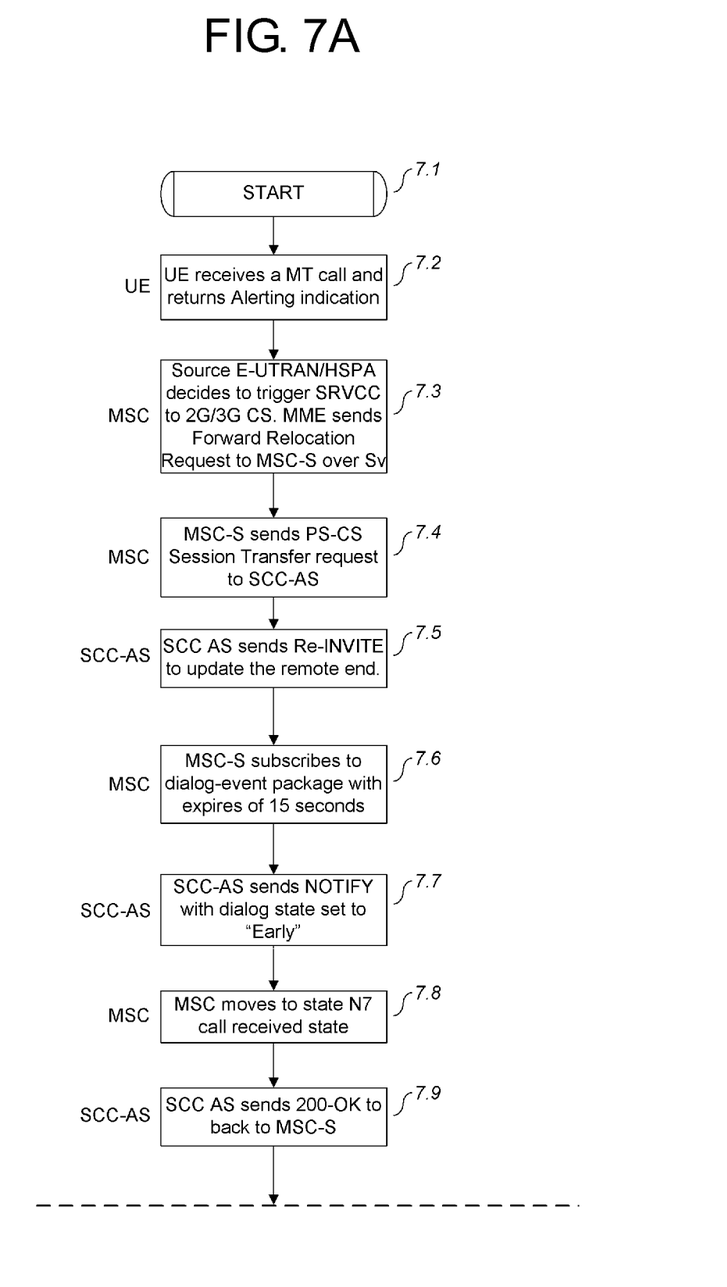
FIG. 7 is a flow diagram illustrating the first and second embodiments of the invention.
Figure 7B:
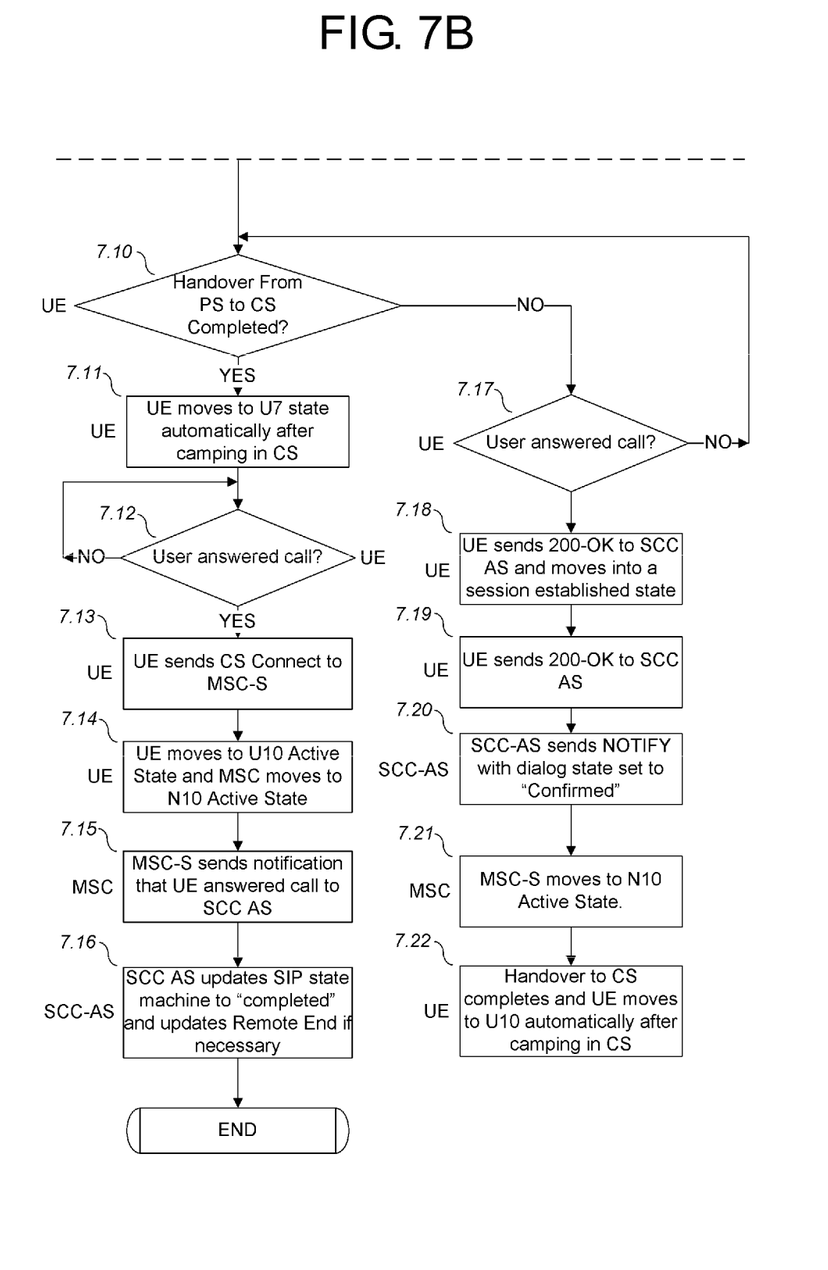

FIG. 7 is a flow diagram illustrating the first and second embodiments of the invention. At step 7.1, the flow diagram starts.

At step 7.2, the user equipment 10 receives a Mobile Terminated (MT) call and returns an alerting indication. This corresponds to steps 4.2 and 4.3 of FIG. 4.

At step 7.3, the source E-UTRAN 22, that is to say the first radio access network, decides that handover is required using SRVCC to the second radio access network, i.e. the UTRAN/GERAN network 12, also referred to as 2G/3G. The MME 18 send a handover request, that may be a "Forward Relocation Request", to the MSC or MSC-S 14, using the "Sv" signalling channel. This corresponds to step 4.6 of FIG. 4.

At step 7.4, the MSC 14, or more specifically the MSC server (MSC-S), sends a packet switched to circuit switched session transfer request to the SCC AS 30. This corresponds to steps 4.7 and 4.8 of FIG. 4.

At step 7.5, the SCC-AS 30 sends "re-INVITE" message to update the remote end; this is part of the SRVCC procedure shown at step 4.9 of FIG. 4.

At step 7.6, the MSC or MSC-S 14 subscribes to an event-dialog package which expires in 15 seconds, i.e. the subscription for status updates is for a predetermined period of 15 seconds. This corresponds to steps 4.10 and 4.11 of FIG. 4.

At step 7.7, the SCC AS 30 sends a "NOTIFY" message with dialog state set to "Early", i.e. the SCC AS 30 sends a status update indicating that the call is in an alerting phase. This corresponds to steps 4.12 and 4.13 of FIG. 4.

At step 7.8, the MSC or MSC-S 14 moves to state N7 call received state, that is to say that the call status indicator at the MSC or MSC-S 14 relating to the call is set to alerting state. This corresponds to step 4.14 of FIG. 4.

At step 7.9, the SCC AS 30 sends a 200-OK message to the MSC or MSC-S 14.

At step 7.10, if the handover has not been completed from the packet switched radio access network (E-UTRAN) to the circuit switched network (UTRAN/GERAN), the process proceeds to step 7.17, and if the user has answered the call, corresponding to step 4.15 of FIG. 4, the user equipment moves to a session established state, and the call status indicator at the user equipment 10 is set to active state at step 7.18.

At step 7.19, the user equipment sends a message indicating that the call status has changed to active state, specifically in this example the user equipment sends a 200-OK message to the SCC AS 30, corresponding to steps 4.16 and 4.17 of FIG. 4.

At step 7.20, the SCC AS 30 sends a "NOTIFY" message to the MSC or MSC-S 14 with dialog state set to "confirmed", that is to say that the SCC AS 30 sends a status update message indicating that the call is in active state, corresponding to steps 4.18 and 4.19 of FIG. 4.

At step 7.21, the MSC or MSC-S 14 moves to N10 active state, i.e. the call status indicator at the MSC 14 moves to active state, corresponding to step 4.20 of FIG. 4.

At step 7.22, handover to the circuit switched radio access network is completed, corresponding to steps 4.21 of FIG. 4. The user equipment moves to state U10 automatically after camping in the circuit switched domain, i.e. the user equipment 10 is in call active state in the second radio access network.

Hence, the call status indicators of the user equipment 10 and the MSC or MSC-S 14 are synchronised; both are in call active state.

If, at step 7.10, the handover from the packet switched radio access network to the circuit switched radio access network has been completed, that is to say that the handover is completed before the call is answered, the process moves to step 7.11.

If the call is then answered in the circuit switched domain, at step 7.12, the user equipment 10 sends a "CS Connect" message to the MSC or MSC-S at step 7.13. That is to say the user equipment 10 sends a message indicating that the call has been answered to the MSC or MSC-S 14.

At step 7.14, the user equipment 10 moves to state U10 active state, which is a call active state appropriate to the circuit switched domain, and the MSC or MSC-S 14 moves to N10 active state, i.e. the call status indicator at the MSC or MSC-S 14 moves to active state.

At step 7.15, the MSC or MSC-S 14 sends notification that the user equipment has answered the call to the SCC AS 30.

At step 7.16, the SCC AS 30 updates a SIP state machine to "completed" and updates remote end if necessary, thereby completing the SRVCC procedure.

Figure 8:
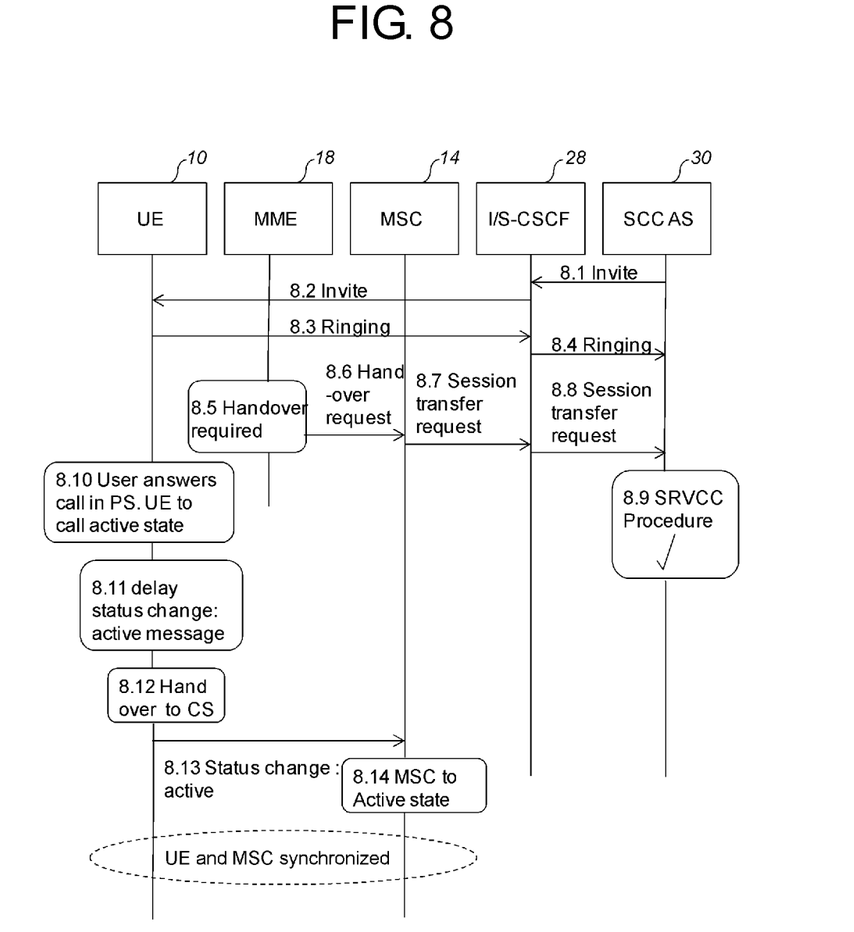
FIG. 8 is a schematic diagram illustrating a fourth embodiment of the invention.

FIG. 8 illustrates a fourth embodiment of the invention, in which a delay in sending information from the user equipment indicating a change of status of a call is used to avoid a situation in which the finite state machines at the UE 10 and the MSC or MSC-S 14 are not synchronised. As has already been described in connection with FIG. 3, this lack of synchronisation is undesirable, as it may result in a race condition, in which operation of the network is not well controlled.

In the fourth embodiment, a likelihood of a handover of the user equipment from the first radio access network to the second radio access network is determined. This determination may be carried out at the user equipment, or all or part of the determination may be carried out by other elements of the telecommunications system. The determination may be based on at least radio measurement reports, which may relate to the characteristics of radio links within the first radio access network. The determination may also take into account the availability of the second radio access network at the location of the user equipment. If, for example, the signal available from the first radio access network is weak or is diminishing in received signal strength, it may be determined that a handover is likely. As the handover decision may typically be made in the first radio access network, in this example in the E-UTRAN, and then communicated to the MME 18, the user equipment may not know when a decision has been made to request handover, but it can nevertheless determine a likelihood of handover.

Dependent on the determined likelihood, the user equipment delays sending information indicating a change in the state of a call by a delay period. If a message carrying the information indicating the change of state is sent when the user equipment is camped in the first radio access network that is a E-UTRAN network employing packet switched communication, the message may be a SIP 200-OK message. If the user equipment is camped in a second radio access network when the message is sent that is a UTRAN/GERAN network employing circuit switched communication, possibly after handover from the first radio access network, the message may be a CS connect message. The delay period may be set to be sufficient time for a handover to take place, which may be typically less than one second. A delay period of 300 ms may be advantageous.

Referring to FIG. 8, steps 8.1 to 8.8 proceed similarly to steps 3.1 to 3.8 respectively in FIG. 3. That is to say, a call to a user equipment 10 is in an alerting phase, and a session transfer request is received at the SCC AS 30 relating to that call. At step 8.9, a SRVCC process is implemented, while the call is in an alerting phase.

At step 8.10, a user answers the call, while the user equipment is still operating using packet switched mode, as it is still connected to the first radio access network. The call status indicator in the user equipment moves to indicate call active status. At step 8.11 a delay is imposed on the sending of a message from the user equipment indicating that the call has been answered. Conventionally, as the user equipment is connected to the first radio access network which is in this example a E-UTRAN packet switched network, a message would be sent using the E-UTRAN network indicating that the call has been answered, typically a SIP 200-OK message, typically sent to the SCC AS 30 via the I/S-CSCF 28. However, in this example the delay to the message is sufficient that handover to the second radio access network at step 8.12, which in this example is an UTRAN/GERAN circuit switched network, may be completed before the message is sent. After the expiry of the delay period, a message indicating that the call has been answered is sent, at step 8.13. Since the UE has now been handed over the second radio access network which is a UTRAN/GERAN circuit switched network, the message is sent using the UTRAN/GERAN network and is typically a CS connect message, sent to the MSC 14.

The call status indicator at the MSC or MSC-S 14 relating to the call is then set to call active state, and so the call status indicators at the user equipment 10 and the MSC or MSC-S 14 are in synchronisation, so that call continuity can be maintained without problems.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of assisting handover of a user equipment from a first radio access network to a second radio access network, the second radio access network being coupled to a mobility controller and having an association with the first radio access network, the user equipment being capable of communication with a session transfer controller by use of the first and second radio access networks, the method comprising:
   receiving a first message at the mobility controller from the first radio access network requesting handover of the user equipment to the second radio access network;
   sending a second message from the mobility controller to the session transfer controller subscribing the mobility controller to status updates originated by the session transfer controller, said status updates relating to a status of a call to or from the user equipment;
   receiving one of said status updates at the mobility controller originated by the session transfer controller, dependent on a communication via the first radio access network from the user equipment to the session transfer controller of a change in the status of said call; and
   in response to receipt of said status update, updating a call status indicator of the mobility controller.

2. The method according to claim 1, wherein said association of the second radio access network with the first radio access network is via a core network associated with the first radio access network, the method comprising receiving the first message from said core network.

3. The method according to claim 1, in which the first radio access network is capable of supporting packet switched voice communication and the second radio access network is capable of supporting circuit switched voice communication.

4. The method according to claim 1, wherein the user equipment has a single radio interface for communicating with the first wireless network and the second wireless network, such that a radio connection with the first wireless network must be broken before a radio connection with the second wireless network is made when participating in said handover.

5. The method according to claim 1, wherein the user equipment has a single radio interface for communicating with the first wireless network and the second wireless network, such that only one radio connection with a wireless network can exist at any given point in time.

6. The method according to claim 1, the method comprising subscribing the mobility controller to said updates for a predetermined period.

7. The method according to claim 6, wherein the predetermined period approximately equals a time period required to complete the handover from the first radio access network to the second radio access network.

8. The method according to claim 1, the method comprising sending the second message dependent upon receipt of the first message at the mobility controller.

9. The method according to claim 1, the method comprising sending the second message in response to receipt of an indication from the session transfer controller that the call is in alerting status.

10. The method according to claim 1, the method comprising:
    receiving the second message at the session transfer controller;
    receiving said communication at the session transfer controller from the user equipment indicating a change of status of said call; and
    dependent on the receipt of the second message and said communication, originating at the session transfer controller one of said status updates to the mobility controller.

11. The method according to claim 10, wherein the one of said status updates indicates that the user has answered the call.

12. The method according to claim 1, wherein the mobility controller is a Mobile Switching Centre Server (MSC-S).

13. The method according to claim 1, wherein the session transfer controller comprises a Service Centralisation and Continuity Application Server (SCC AS).

14. The method according to claim 1, wherein the handover comprises Single Radio Voice Call Continuity (SRVCC) procedures.

15. A mobility controller capable of assisting handover of a user equipment from a first radio access network to a second radio access network, the second radio access network being coupled to the mobility controller and having an association with the first radio access network, and the first and second radio access networks being capable of communication with a session transfer controller, the mobility controller being arranged to:
    receive a first message from the first radio access network requesting handover of the user equipment to the second radio access network;
    send a second message to the session transfer controller subscribing the mobility controller to status updates originated by the session transfer controller, said status updates relating to a status of a call to or from the user equipment;
    receive one of said status updates at the mobility controller originated by the session transfer controller, dependent on a communication via the first radio access network from the user equipment to the session transfer controller of a change in the status of said call; and
    in response to receipt of said status update, update a call status indicator of the mobility controller to synchronize the call status in the mobility controller with that of the user equipment in support of continuity of the call on handover of the user equipment to the second radio access network.

16. A session transfer controller capable of assisting handover of a user equipment from a first radio access network to a second radio access network, the second radio access network being coupled to a mobility controller and having an association with the first radio access network, and the first and second radio access networks being capable of communication with the session transfer controller, the session transfer controller being arranged to:
    receive a second message originated by the mobility controller subscribing the mobility controller to status updates originated by the session transfer controller, said status updates relating to a status of a call to or from the user equipment;
    receiving a communication from the user equipment indicating a change of status of said call; and
    dependent on the receipt of the second message and said communication, originate one of said status updates to the mobility controller.

\* \* \* \* \*